United States Patent
Wang

(10) Patent No.: US 8,020,823 B2
(45) Date of Patent: Sep. 20, 2011

(54) THREE-DIMENSIONAL MULTI-DIRECTIONAL ROTATION SUPPORT

(76) Inventor: Chao-Lang Wang, Xizhi (TW)

( * ) Notice: Subject to any disclaimer, the term of this patent is extended or adjusted under 35 U.S.C. 154(b) by 31 days.

(21) Appl. No.: 12/654,727

(22) Filed: Dec. 30, 2009

(65) Prior Publication Data

US 2011/0108695 A1    May 12, 2011

(30) Foreign Application Priority Data

Nov. 10, 2009    (TW) .............................. 98138044 A

(51) Int. Cl.
*E04G 3/00* (2006.01)
(52) U.S. Cl. .................................. 248/278.1; 248/284.1
(58) Field of Classification Search ............... 248/284.1, 248/274.1, 276.1, 278.1, 292.12, 288.11; 403/52, 55, 57
See application file for complete search history.

(56) References Cited

U.S. PATENT DOCUMENTS

| | | | | |
|---|---|---|---|---|
| 5,109,411 A * | 4/1992 | O'Connell | ................... | 379/454 |
| 5,794,908 A * | 8/1998 | East et al. | ................... | 248/503.1 |
| 6,367,756 B1 * | 4/2002 | Wang | ................... | 248/278.1 |
| 6,505,988 B1 * | 1/2003 | Oddsen, Jr. | ................... | 403/110 |
| 6,568,869 B1 * | 5/2003 | Murata | ................... | 403/52 |
| 6,664,937 B2 * | 12/2003 | Vermette et al. | ................... | 343/892 |
| 2008/0197256 A1 * | 8/2008 | Hirschhorn | ................... | 248/276.1 |
| 2008/0277551 A1 * | 11/2008 | Hackney | ................... | 248/276.1 |

* cited by examiner

*Primary Examiner* — Anita M King

(74) *Attorney, Agent, or Firm* — Bacon & Thomas, PLLC

(57) ABSTRACT

The present invention is to provide a three-dimensional multi-directional rotation support, which comprises a fixation base, a first connection base and a second connection base each having a plate with two opposite end edges bent at an angle and extended away from the plate to form a parallel portion respectively, wherein both of the parallel portions are parallel to each other and each of the parallel portion is formed with a pivot hole having a plurality of positioning points formed on the periphery thereof, so that the fixation base can be fixed on a plane, the second connection base can be fixed with an object, and the first connection base can be pivotally connected between the fixation base and the second connection base, enabling a user to adjust various angles of the object to a best direction in a three-dimensional space according to actual needs of the user.

8 Claims, 4 Drawing Sheets

US 8,020,823 B2

THREE-DIMENSIONAL MULTI-DIRECTIONAL ROTATION SUPPORT

FIELD OF THE INVENTION

The present invention relates to a support, more particularly to a three-dimensional multi-directional rotation support, capable of fixing an object (such as a loudspeaker, a stage lamp, . . . etc.) onto a plane (such as a ceiling, a wall, . . . etc.) or a rod and enabling a user to adjust various angles of the object in a three-dimensional space according to actual needs of the user, so as to position the object at a best direction in the three-dimensional space.

BACKGROUND OF THE INVENTION

Presently, fixation supports exist in various types, all for fixing objects (such as a loudspeaker, a stage lamp, . . . etc.) on planes (such as a ceiling, a wall, . . . etc.). For example, one type of the fixation support is described hereinafter. Referring now to FIG. 1, a fixation support 10 comprises a fixation base 11 and an object base 12, wherein the fixation base 11 has a first plate 110 which can be fixed on a plane 14 by a screw 13. Each of an upper end and a lower end of the first plate 110 is extended away from a side surface thereof to form a first connection plate 111, respectively. The first connection plates 111 are parallel to each other, and each of the first connection plates 111 is formed with a first pivot hole 112 on one end thereof away from the first plate 110. Furthermore, the object base 12 has a second plate 120 which can be fixed on an object 15 by another screw 13. Each of an upper end and a lower end of the second plate 120 is extended away from a side surface thereof to form a second connection plate 121, respectively. The second connection plates 121 are parallel to each other, and each of the second connection plates 121 is formed with a second pivot hole 122 on one end thereof away from the second plate 120. Each of the second connection plates 121 has an inner side surface attached to an outer side surface of each of the fist connection plates 111, and then each of the second connection plates 121 can be pivotally connected to each of the fist connection plates 111 by a screw bolt assembly 16 which passes through the second pivot holes 122 and the first pivot holes 112. As a result, a user not only can fix the object 15 on the plane 14 by the fixation support 10, but also can adjust the angle of the object 15 along a fixed horizontal position by the fixation support 10, so that the object 15 can be adjusted to face a predetermine direction preset by the user.

However, referring to FIG. 1 again, there are still some disadvantages existing in the operation of the foregoing fixation support 10, as follows:

(1) When the object 15 is fixed on the plane 14 by the fixation support 10, the fixation support 10 only provides a single pivotal point between the fixation base 11 and the object base 12. Thus, the user only can adjust the angle of the object 15 along the fixed horizontal position, but cannot adjust various angles of the object 15 in a three-dimensional space according to actual operational needs, resulting in various inconvenience and troubles of the user's operation. For example, when the object 15 is one loudspeaker of a stereo system, the user generally fixes the loudspeaker by the fixation support 10, and adjusts the loudspeaker to face a predetermine direction. Therefore, when the stereo system starts, the loudspeaker can match with other loudspeakers to provide a stereo effect. However, if the loudspeaker cannot be adjusted to a precise sound position, the sound generated by the loudspeaker cannot match with sounds generated by other loudspeakers to provide the stereo effect after the stereo system starts. As a result, the user cannot enjoy the best stereo effect.

(2) Each of the first connection plates 111 of the fixation base 11 is vertically formed on the first plate 110, respectively. However, referring now to FIG. 2, when the user fixes the object 15 on the plane 14 by the fixation support 10, the weight of the object 15 may easily focus on a position connected between the first plate 110 away from the object 15 and each of the first connection plates 111. As a result, the position connected between each of the first connection plates 111 and the first plate 110 may be bent and deformed, and even cracked, resulting in damaging the fixation base 11 or increasing the fall risk of the object 15.

As a result, it is important for the inventor of the present invention to think how to develop an innovative fixation support to solve the problem existing in the conventional fixation support that cannot carry out three-dimensional multi-directional rotation and thus cause that the user cannot adjust the fixation support according to actual needs for positioning the object toward a best direction in a three-dimensional space, and solve the other problem existing in the conventional fixation support that may be easily deformed and cracked to increase the fall risk of the object during supporting the object.

It is therefore tried by the inventor to develop a three-dimensional multi-directional rotation support to solve the problems and disadvantages existing in the conventional fixation support that cannot carry out three-dimensional multi-directional rotation and cannot stably support an object (such as a loudspeaker, a stage lamp, . . . etc.), as described above.

BRIEF SUMMARY OF THE INVENTION

An object of the present invention is to provide a three-dimensional multi-directional rotation support, which comprises a fixation base, a first connection base and a second connection base, wherein the fixation base can be fixed on a plane (such as a ceiling, a wall, . . . etc.) or a rod, the fixation base comprises a first plate having two opposite end edges extended away from one side surface of the first plate to form a first extension plate, respectively, wherein each of the first extension plate is bent at a first angle in relation to the first plate and then extended to form a first parallel portion, wherein both of the first parallel portions are parallel to each other, and each of the first parallel portion is formed with a first pivot hole which has a plurality of positioning points formed on the periphery thereof. The first connection base comprises a second plate formed with a first connection hole which has a plurality of positioning points formed on the periphery thereof; wherein two opposite end edges of the second plate are extended away from one side surface of the second plate to form a second extension plate, respectively, wherein each of the second extension plate is bent at a second angle in relation to the second plate and then extended to form a second parallel portion, wherein both of the second parallel portions are parallel to each other, and each of the second parallel portion is formed with a second pivot hole which has a plurality of positioning points formed on the periphery thereof. An outer or inner side surface of each of the second parallel portions can be attached to a corresponding inner or outer side surface of each of the first parallel portions, while a first screw assembly can pass through the second pivot holes and the first pivot holes to pivotally connect the second parallel portions with the first parallel portions, wherein the positioning points of the second parallel portions are engaged with the corresponding positioning points of the first parallel portions. The second connection base comprises a third plate formed with a second connection hole which has a plurality of positioning points formed on the periphery thereof; wherein a second screw assembly can pass through the second connection hole and the first connection hole to pivotally connect the third plate with the second plate, while the positioning points of the third plate are engaged with the corresponding positioning points of the second plate. Two opposite end edges of the third plate are extended away from one side surface of the third plate to form a third extension plate, respectively, wherein each of the third extension plate is bent at a third angle in relation to the third plate and then extended to form a third parallel portion, wherein both of the third parallel portions are parallel to each other, and each of the third parallel portion is formed with a third pivot hole which has a plurality of positioning points formed on the periphery thereof. As a result, when a user fixes the object on the plane or the rod by the multi-directional rotation support, the multi-directional rotation design of the multi-directional rotation support not only can substantially increase the support strength thereof to stably fix the object on the plane or the rod, but also can adjust various angles of the object in a three-dimensional space according to actual needs of the user, so as to position the object at a best direction in the three-dimensional space.

BRIEF DESCRIPTION OF THE SEVERAL VIEWS OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE INVENTION

Figure 1:
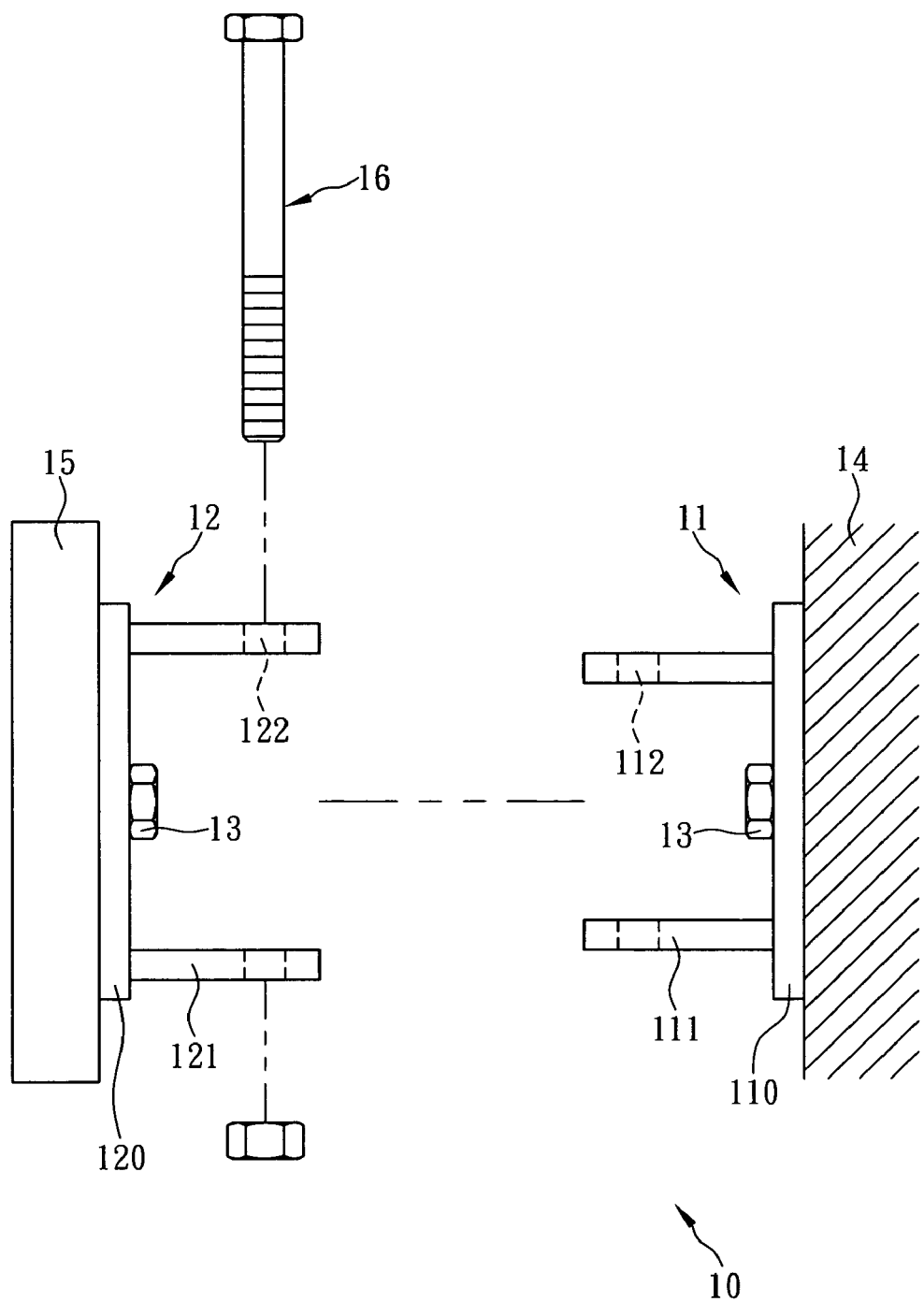
FIG. 1 is an exploded side view of a traditional fixation support.
Figure 2:
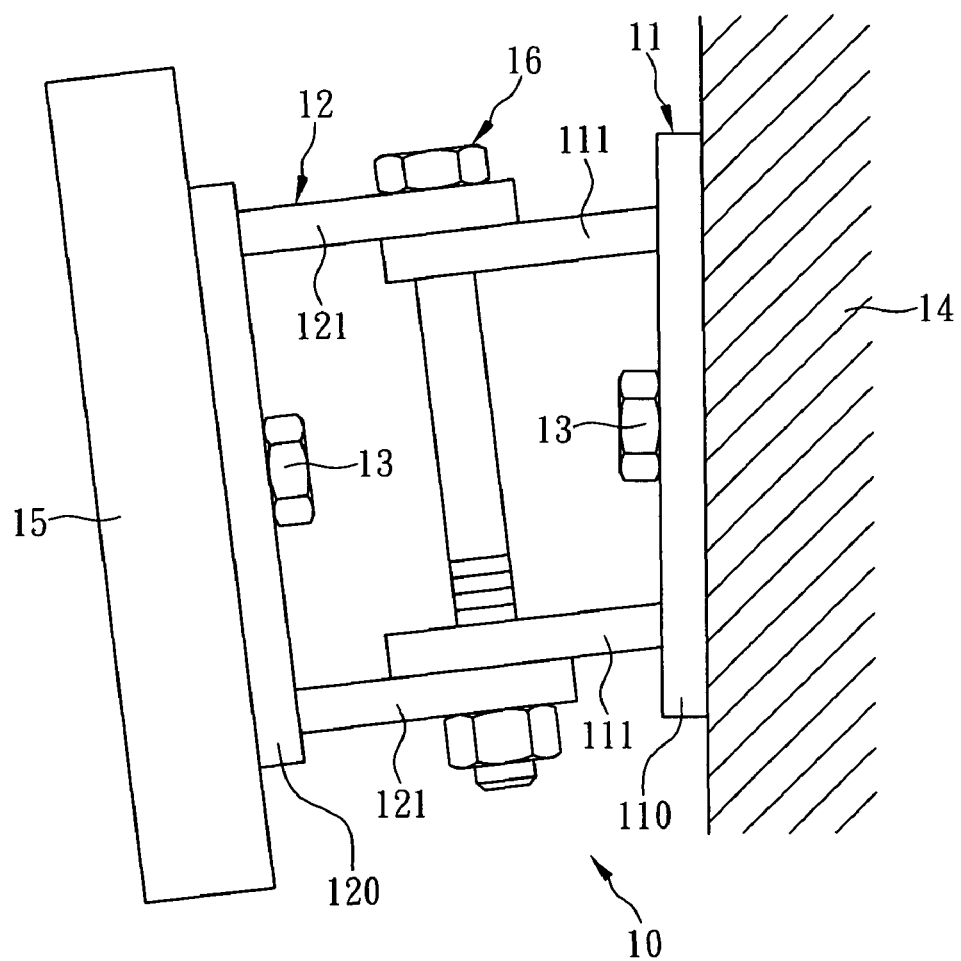
FIG. 2 is an operational view of the traditional fixation support.
Figure 3:
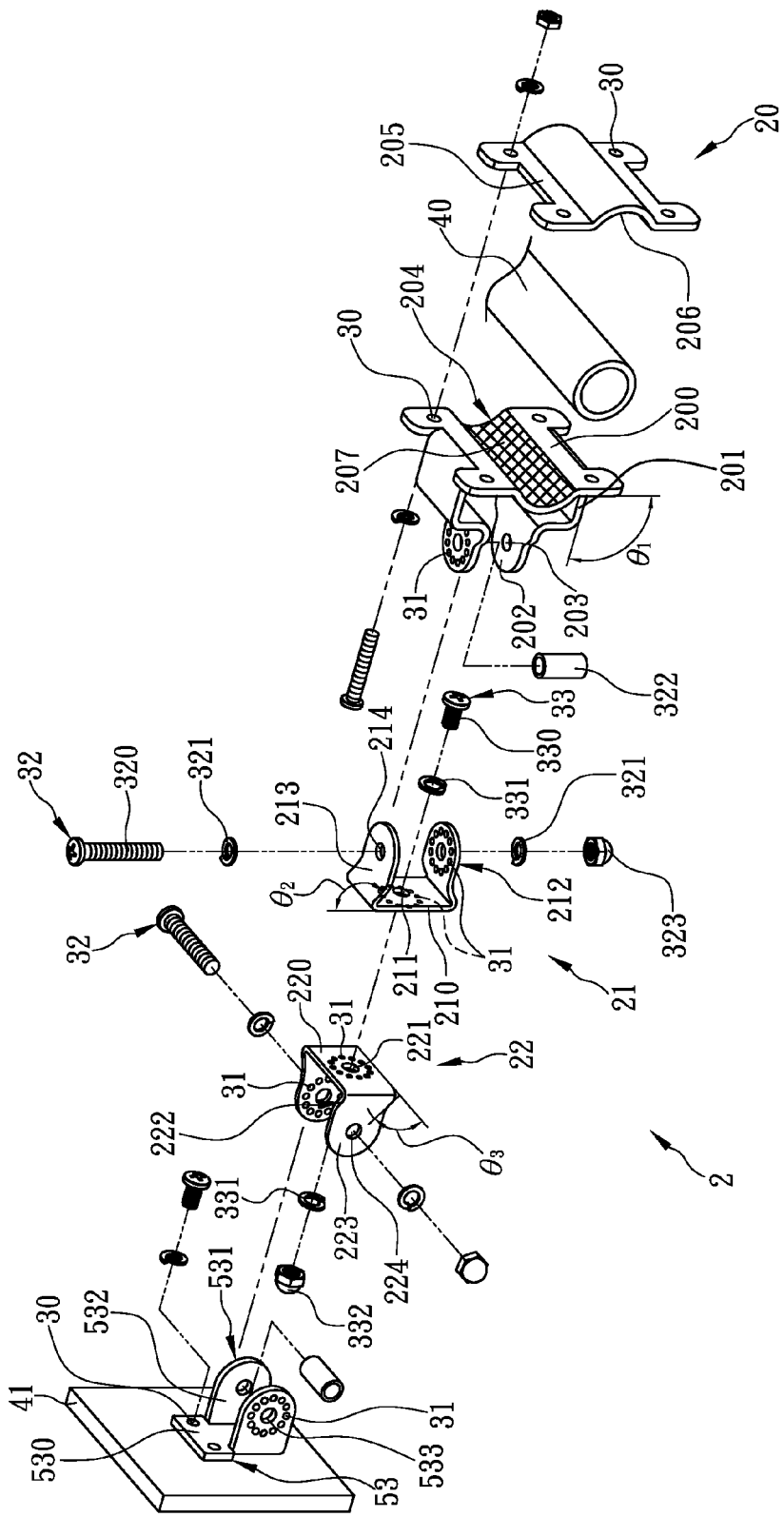
FIG. 3 is an exploded perspective view of a three-dimensional multi-directional rotation support according to a first preferred embodiment of the present invention.

The present invention is a fixation support capable of providing three-dimensional multi-directional rotation, referring now to FIG. 3, in a first preferred embodiment of the present invention, a three-dimensional multi-directional rotation support 2 comprises a fixation base 20, a first connection base 21 and a second connection base 22, wherein the fixation base 20 comprises a first plate 200 which has a plurality of fixation holes 30 formed thereon, so that the fixation holes 30 can be passed through by screws to fix the first plate 200 on a plane (such as a ceiling, a wall, etc.). The first plate 200 has two opposite end edges extended to form a first extension plate 201, respectively, wherein each of the first extension plate 201 is extended away from one side surface of the first plate 200, bent at a first angle $\theta_1$ in relation to the first plate 200, and then extended to form a first parallel portion 202, wherein both of the first parallel portions 202 are parallel to each other, and each of the first parallel portions 202 is formed with a first pivot hole 203 which has a plurality of positioning points 31 (convex points or concave points) radially and equidistantly formed on the periphery thereof. Furthermore, the first connection base 21 comprises a second plate 210 formed with a first connection hole 211 which has a plurality of positioning points 31 (convex points or concave points) radially and equidistantly formed on the periphery thereof wherein two opposite end edges of the second plate 210 are extended to form a second extension plate 212, respectively, wherein each of the second extension plate 212 is extended away from one side surface of the second plate 210, bent at a second angle $\theta_2$ in relation to the second plate, and then extended to form a second parallel portion 213, wherein both of the second parallel portions 213 are parallel to each other, and each of the second parallel portion 213 is formed with a second pivot hole 214 which has a plurality of positioning points 31 (convex points or concave points) radially and equidistantly formed on the periphery thereof. An outer (or inner) side surface of each of the second parallel portions 213 can be attached to a corresponding inner (or outer) side surface of each of the first parallel portions 202, while a first screw assembly 32 can pass through the second pivot holes 214 and the first pivot holes 203 to pivotally connect the second parallel portions 213 with the first parallel portions 202, wherein the positioning points 31 of the second parallel portions 213 are engaged with the corresponding positioning points 31 of the first parallel portions 202. Moreover, the second connection base 22 comprises a third plate 220 formed with a second connection hole 221 which has a plurality of positioning points 31 (convex points or concave points) radially and equidistantly formed on the periphery thereof wherein a second screw assembly 33 can pass through the second connection hole 221 and the first connection hole 211 to pivotally connect the third plate 220 with the second plate 210, while the positioning points 31 of the third plate 220 are engaged with the corresponding positioning points 31 of the second plate 210. Two opposite end edges of the third plate 220 are extended to form a third extension plate 222, respectively, wherein each of the third extension plate 222 is extended away from one side surface of the third plate 220, bent at a third angle $\theta_3$ in relation to the third plate 220, and then extended to form a third parallel portion 223, wherein both of the third parallel portions 223 are parallel to each other, and each of the third parallel portion 223 is formed with a third pivot hole 224 which has a plurality of positioning points 31 (convex points or concave points) radially and equidistantly formed on the periphery thereof.

As a result, in the preferred embodiment of the present invention, when a user fixes an object 41 (such as a loudspeaker, a stage lamp, etc.) on the plane by the multi-directional rotation support 2, the multi-directional rotation support 2 further comprises an object base 53, wherein the object base 53 has a fourth plate 530 having a plurality of fixation holes 30 formed thereon, so that the fixation holes 30 can be passed through by screws to fix the fourth plate 530 on the object 41. The fourth plate 530 has two opposite end edges extended to form a fourth extension plate 531, respectively, wherein each of the fourth extension plate 531 is extended away from one side surface of the fourth plate 530 to form a fourth parallel portion 532, wherein both of the fourth parallel portions 532 are parallel to each other, and each of the fourth parallel portion 532 is formed with a fourth pivot hole 533 which has a plurality of positioning points 31 (convex points or concave points) radially and equidistantly formed on the periphery thereof. An outer (or inner) side surface of each of the fourth parallel portions 533 can be attached to a corresponding inner (or outer) side surface of each of the third parallel portions 223 of the second connection base 22, while another first screw assembly 32 can pass through the third pivot holes 224 and the fourth pivot holes 533 to pivotally connect the fourth parallel portions 532 with the third parallel portions 223, wherein the positioning points 31 of the fourth parallel portions 532 are engaged with the corresponding positioning points 31 of the third parallel portions 223. As a result, the object 41 can be directly installed on the multi-directional rotation support 2. Because the multi-directional rotation support 2 has the multi-directional rotation design, the present invention can efficiently prevent the first extension plate 201, the second extension plate 212 and the third extension plate 222 from being deformed due to overweight loading during the fixation base 20, the first connection base 21 and the second connection base 22 load the weight of the object 41. Therefore, the multi-directional rotation design of the multi-directional rotation support 2 not only can substantially increase the support strength and the life thereof to stably fix the object 41 on the plane, but also can adjust various angles of the object 41 in a three-dimensional space according to actual needs of the user, so as to position the object 41 at a best direction in the three-dimensional space.

In the preferred embodiment of the present invention, referring still to FIG. 3, the other side surface of the first plate 200 can be provided with a first flange 204, while the fixation base 20 further has a fifth plate 205 which is provided with a second flange 206 on one side surface thereof. The surface of each of the first flange 204 and the second flange 206 is formed with an anti-slip pattern 207. One side surface of the fifth plate 205 can be attached to the other side surface of the first plate 200, so that the fifth plate 205 and the first plate 200 can be fixed on a rod 40 by all of the first flange 204, the second flange 206 and the anti-slip patterns 207. Thus, the application and practicality of the multi-directional rotation support 2 can be increased.

Figure 4:
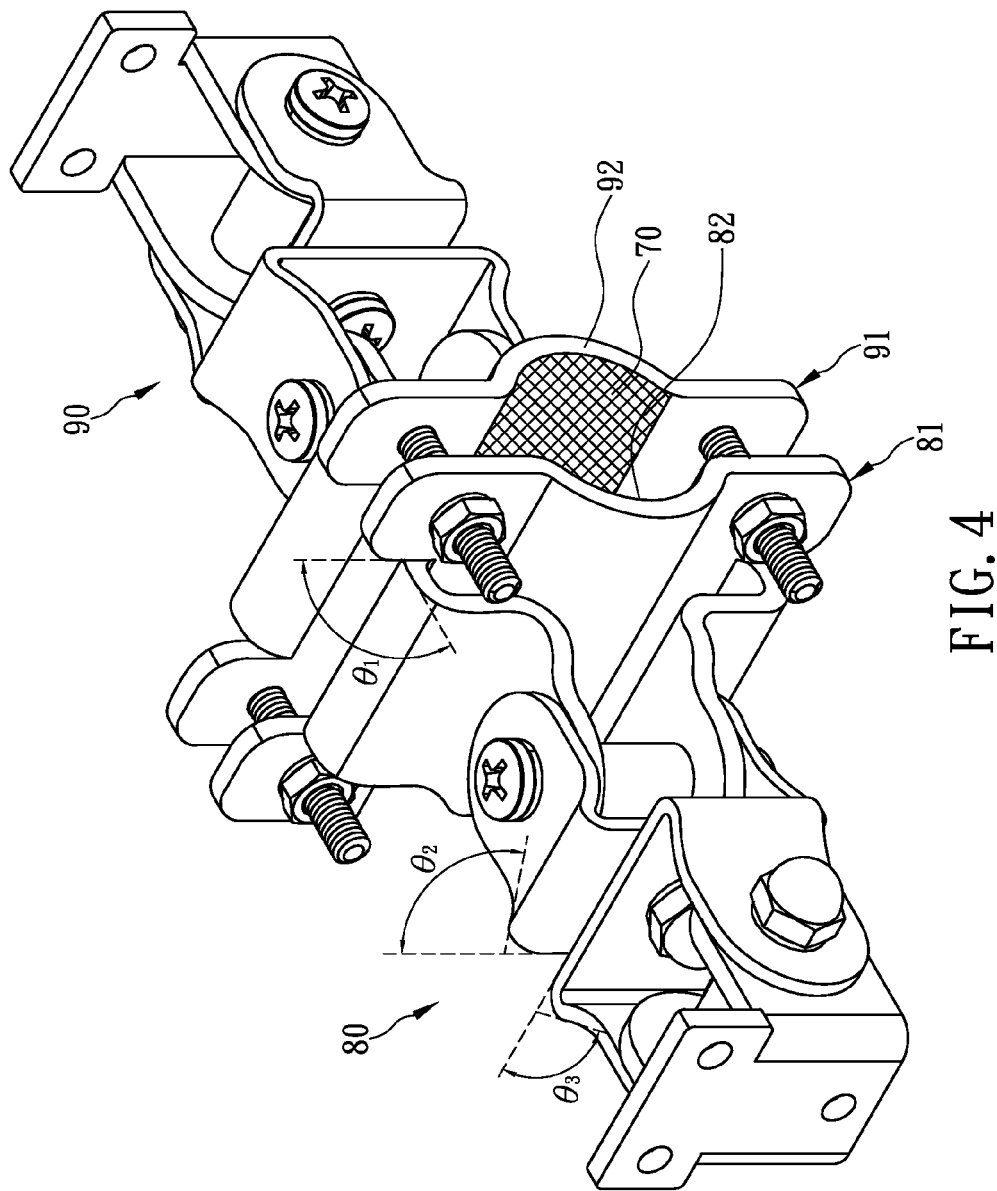
FIG. 4 is an assembled perspective view of a three-dimensional multi-directional rotation support according to a second preferred embodiment of the present invention.

In a second preferred embodiment of the present invention, referring to FIG. 4, a three-dimensional multi-directional rotation support 80 is provided with a fixation base 81 having a first flange 82, while another three-dimensional multi-directional rotation support 90 is provided with a fixation base 91 having a second flange 92, wherein the first flange 82 of the fixation base 81 can be matched with the second flange 92 of the fixation base 91, so that the multi-directional rotation supports 80, 90 can be fixed on a rod 40, as shown in FIG. 3. The surface of each of the first flange 82 and the second flange 92 is formed with an anti-slip pattern 70. As a result, the user can be used to fix a plurality of objects 41 (as shown in FIG. 3) on the single rod 40 by each of the multi-directional rotation supports 80, 90. Thus, the application and practicality of the multi-directional rotation supports 80, 90 can be increased.

In each of the preferred embodiments of the present invention, referring back to FIG. 3, the first screw assembly 32 comprises a first screw rod 320, two first spring washers 321, a sleeve 322 and a first nut 323, wherein one end of the first screw rod 320 can pass through one of the first spring washers 321, one of the first, second, third or fourth pivot holes 203, 214, 224 or 533, the sleeve 322, the other of the first, second, third or fourth pivot holes 203, 214, 224 or 533 and the other of the first spring washers 321 in turn, and then be screw-connected to the first nut 323. Therefore, for example, in a case that the user uses the first screw assemblies 32 to fix the fixation base 20 and the first connection base 21, it can efficiently prevent the multi-directional rotation support 2 from being deformed due to loading of the weight of the object 41 during the multi-directional rotation support 2 fixes the object 41 on the plane or the rod 40 because the length of the sleeve 322 is substantially equal to the distance sandwiched between two of the first parallel portions 202 (or two of the second parallel portions 213). In addition, each of the first spring washers 321 can bias against each of the first parallel portions 202 or the second parallel portions 213, so that the positioning points 31 of the first parallel portions 202 and the second parallel portions 213 can be stably engaged with each other. As a result, when the user rotates the first connection base 21 pivotally connected to the fixation base 20, the first connection base 21 can be positioned on a predetermined position according to the user's needs, so that the user can conveniently adjust various angles of the object 41 in a three-dimensional space.

Furthermore, in each of the preferred embodiments of the present invention, the second screw assembly 33 comprises a second screw rod 330, two second spring washers 331 and a second nut 332, wherein one end of the second screw rod 330 can pass through one of the second spring washers 331, the first connection holes 211, the second connection hole 221 and the other of the second spring washers 331 in turn, and then be screw-connected to the second nut 332. Therefore, in a case that the user uses the second screw assemblies 33 to the first connection base 21 and the second connection base 22, each of the second spring washers 331 can bias against the second plate 210 and the third plate 220 for stably engaging the positioning points 31 of the second plate 210 and the third plate 220 with each other. As a result, when the user rotates the second connection base 22 pivotally connected to the first connection base 21, the second connection base 22 can be positioned on a predetermined position according to the user's needs, so that the user can conveniently adjust various angles of the object 41 in the three-dimensional space.

Besides, in each of the preferred embodiments of the present invention, the third angle $\theta_3$ is preferably greater than the second angle $\theta_2$, and the second angle $\theta_2$ is preferably greater than the first angle $\theta_1$. Thus, although the part of the multi-directional rotation support 2 away from the object 41 is affected by the weight of the object 41, the angle design of the first, second and third angles $\theta_1$, $\theta_2$ and $\theta_3$ can efficiently offset the weight directly applied to the first, second and third plates 200, 210, 220 and each of the first, second and third extension plates 201, 212, 222. As a result, it can efficiently prevent the foregoing part of the multi-directional rotation support 2 from be bent and deformed, so as to elongate the life of the multi-directional rotation support 2.

As described above, referring back to FIG. 3, according to the present invention, the user can use the three-dimensional multi-directional rotation support 2 to fix the object 41 on the plane or the rod 40 for substantially increasing the support strength of the multi-directional rotation support 2 by the angle designs thereof, so that the object 41 can be stably fixed on the plane or the rod 40. Meanwhile, the user can adjust various angles of the object 41 in the three-dimensional space according to actual needs, so that the object 41 can be positioned at a best direction in the three-dimensional space.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A three-dimensional multi-directional rotation support, comprising:
    a fixation base comprising a first plate having two opposite end edges extended to form a first extension plate, respectively, wherein each of the first extension plates is extended away from one side surface of the first plate, bent at a first angle in relation to the first plate, and then extended to form a first parallel portion, wherein both of the first parallel portions are parallel to each other, and each of the first parallel portions is formed with a first pivot hole which has a plurality of positioning points radially and equidistantly formed on a periphery thereof;

a first connection base comprising a second plate formed with a first connection hole which has a plurality of positioning points radially and equidistantly formed on a periphery thereof; wherein two opposite end edges of the second plate are extended to form a second extension plate, respectively, wherein each of the second extension plates is extended away from one side surface of the second plate, bent at a second angle in relation to the second plate, and then extended to form a second parallel portion, wherein both of the second parallel portions are parallel to each other, and each of the second parallel portion is formed with a second pivot hole which has a plurality of positioning points radially and equidistantly formed on a periphery thereof; wherein an outer or inner side surface of each of the second parallel portions is attached to a corresponding inner or outer side surface of each of the first parallel portions, while a first screw assembly passes through the second pivot holes and the first pivot holes to pivotally connect the second parallel portions with the first parallel portions, and wherein the positioning points of the second parallel portions are engaged with the corresponding positioning points of the first parallel portions; and a second connection base comprising a third plate formed with a second connection hole which has a plurality of positioning points radially and equidistantly formed on a periphery thereof; wherein a second screw assembly passes through the second connection hole and the first connection hole to pivotally connect the third plate with the second plate, while the positioning points of the third plate are engaged with the corresponding positioning points of the second plate; wherein two opposite end edges of the third plate are extended to form a third extension plate, respectively, wherein each of the third extension plates is extended away from one side surface of the third plate, bent at a third angle in relation to the third plate, and then extended to form a third parallel portion, wherein both of the third parallel portions are parallel to each other, and each of the third parallel portion is formed with a third pivot hole which has a plurality of positioning points radially and equidistantly formed on a periphery thereof.

2. The three-dimensional multi-directional rotation support according to claim 1, further comprising an object base which has a fourth plate fixed on an object and having two opposite end edges extended to form a fourth extension plate, respectively, wherein each of the fourth extension plate is extended away from one side surface of the fourth plate to form a fourth parallel portion, wherein both of the fourth parallel portions are parallel to each other, and each of the fourth parallel portions is formed with a fourth pivot hole which has a plurality of positioning points radially and equidistantly formed on a periphery thereof; wherein an outer or inner side surface of each of the fourth parallel portions is attached to a corresponding inner or outer side surface of each of the third parallel portions of the second connection base, while another first screw assembly passes through the third pivot holes and the fourth pivot holes to pivotally connect the fourth parallel portions with the third parallel portions, and wherein the positioning points of the fourth parallel portions are engaged with the corresponding positioning points of the third parallel portions.

3. The three-dimensional multi-directional rotation support according to claim 2, wherein the first screw assembly comprises a first screw rod, two first spring washers, a sleeve and a first nut, wherein one end of the first screw rod passes through one of the first spring washers, one of the first, second, third or fourth pivot holes, the sleeve, the other of the first, second, third or fourth pivot holes and the other of the first spring washers in turn, and then is screw-connected to the first nut.

4. The three-dimensional multi-directional rotation support according to claim 3, wherein the third angle is greater than the second angle, and the second angle is greater than the first angle.

5. The three-dimensional multi-directional rotation support according to claim 4, wherein the second screw assembly comprises a second screw rod, two second spring washers and a second nut, wherein one end of the second screw rod passes through one of the second spring washers, the first connection hole, the second connection hole and the other of the second spring washers in turn, and then is screw-connected to the second nut.

6. The three-dimensional multi-directional rotation support according to claim 5, wherein the first plate has a plurality of fixation holes formed thereon, and the fixation holes are passed through by screws to fix the first plate on a plane.

7. The three-dimensional multi-directional rotation support according to claim 6, wherein the other side surface of the first plate is provided with a first flange, while the fixation base further has a fifth plate which is provided with a second flange on one side surface thereof; and wherein the side surface of the fifth plate is attached to the other side surface of the first plate, while the fifth plate and the first plate are fixed on a rod by the first flange and the second flange.

8. The three-dimensional multi-directional rotation support according to claim 7, wherein the surface of each of the first flange and the second flange is formed with an anti-slip pattern.

* * * * *